(12) United States Patent　　(10) Patent No.: US 7,523,917 B2
Arai　　(45) Date of Patent: Apr. 28, 2009

(54) MOTOR-OPERATED VALVE

(75) Inventor: Yusuke Arai, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 488 days.

(21) Appl. No.: 11/414,923

(22) Filed: May 1, 2006

(65) Prior Publication Data

US 2007/0018128 A1　Jan. 25, 2007

(30) Foreign Application Priority Data

Jul. 19, 2005　(JP) ............................. 2005-208399

(51) Int. Cl.
　　*F16K 31/02*　(2006.01)
(52) U.S. Cl. .................. 251/129.11; 251/248
(58) Field of Classification Search ............ 251/129.11, 251/248
　See application file for complete search history.

(56) References Cited

U.S. PATENT DOCUMENTS

| | | | |
|---|---|---|---|
| 3,279,744 A * | 10/1966 | Fieldsen et al. ........ | 251/129.03 |
| 4,754,949 A * | 7/1988 | Fukamachi ............ | 251/129.03 |
| 4,896,562 A * | 1/1990 | Wilkinson et al. ............. | 475/3 |
| 4,994,001 A * | 2/1991 | Wilkinson et al. ............. | 475/4 |
| 6,080,075 A * | 6/2000 | Wussow et al. ............. | 475/149 |
| 6,254,058 B1 | 7/2001 | Keller | |
| 6,379,276 B1 | 4/2002 | Cheng | |
| 6,488,259 B1 * | 12/2002 | Fujita et al. ............ | 251/129.11 |
| 6,672,280 B2 * | 1/2004 | Price et al. .................. | 123/337 |
| 6,682,045 B2 * | 1/2004 | Hashimoto ............. | 251/129.11 |
| 6,923,427 B2 * | 8/2005 | Yonezawa ............... | 251/129.11 |
| 2003/0052296 A1 * | 3/2003 | Minegishi ................... | 251/305 |
| 2003/0141479 A1 * | 7/2003 | Witzel et al. ................ | 251/305 |
| 2003/0226995 A1 * | 12/2003 | Burgos ....................... | 251/248 |

FOREIGN PATENT DOCUMENTS

| | | |
|---|---|---|
| DE | 23 46 067 | 3/1975 |
| EP | 1693600 | 8/2006 |
| JP | 2000-356278 | 12/2000 |
| JP | 2002-084732 | 3/2002 |
| JP | 2003-232465 | 8/2003 |
| WO | 03/023265 | 3/2003 |

* cited by examiner

*Primary Examiner*—John K Fristoe, Jr.
(74) *Attorney, Agent, or Firm*—Fildes & Outland, P.C.

(57) ABSTRACT

A motor-operated valve includes a valve body having a valve chamber and a valve seat; a valve element; a valve rod for operating the valve element; a cylindrical can fixed to the valve body; a motor energizing device mounted in the outer peripheral portion of the can; a permanent magnet type rotor assembly which is supported rotatably on the inner peripheral portion of the can and is rotationally driven by the motor energizing device; a reduction gear apparatus for reducing the rotational speed of the rotor assembly; and a screw mechanism for advancing and retreating the valve element with respect to the valve seat via the reduction gear apparatus by means of the rotational movement of the rotor assembly. The rotor assembly and the reduction gear apparatus are arranged in a space defined by the valve body and the can.

3 Claims, 11 Drawing Sheets

SECTIONAL VIEW
TAKEN ALONG LINE
X-X'

(b)

VIEW TAKEN IN THE DIRECTION OF ARROW Y (c)

MOTOR-OPERATED VALVE

The present application is based on and claims priority of Japanese patent applications No. 2005-208399 filed on Jul. 19, 2005, the entire contents of which are hereby incorporated by reference.

BACKGROUND OF THE INVENTION

1. Field of the Invention

The present invention relates to a motor-operated valve for controlling the flow rate of a refrigerant for an air conditioner and, more particularly, to a canned gear motor-operated valve provided with a gear reduction mechanism in a can, which is a gastight vessel.

2. Description of the Related Art

It is known that motor-operated valves, which are opened and closed via an electric motor, are broadly divided into two types. A first type is a type in which the valve is opened and closed by directly transmitting the rotation of a rotor to a screw mechanism, and is disclosed, for example, in Patent Reference 1. A second type is a type in which the valve has a reduction gear apparatus for transmitting the rotation of the rotor to the screw mechanism while reducing the speed, and is disclosed, for example, in Patent References 2 and 3.

[Patent Reference 1] Japanese Patent Laid-Open No. 2000-356278

[Patent Reference 2] Japanese Patent Laid-Open No. 2002-84732

[Patent Reference 3] Japanese Patent Laid-Open No. 2003-232465

The motor-operated valve of the first type has a relatively compact configuration, but has a disadvantage that the application thereof is limited to a case where the load is low, and it is difficult to increase the resolution of valve opening per one drive pulse.

The motor-operated valve of the second type can be used even in a case where the load is high and can be configured so that the resolution of valve opening per one drive pulse is increased, but has a problem in that the size of the whole of the motor-operated valve is increased because a gearbox for a reduction gear apparatus is provided separately from a motor section.

An object of the present invention is to provide a motor-operated valve suitable for accommodating a reduction gear apparatus in a small space in a rotor in a compact manner.

SUMMARY OF THE INVENTION

A motor-operated valve in accordance with the present invention includes, as basic means, a valve body having a valve chamber and a valve seat; a valve element disposed so as to be capable of opening and closing an opening of the valve seat in the valve chamber; a valve rod for operating the valve element; a cylindrical can fixed to the valve body; a motor energizing device mounted in an outer peripheral portion of the can; a permanent magnet type rotor assembly which is supported rotatably on an inner peripheral portion of the can and is rotationally driven by the motor energizing device; a reduction gear apparatus for reducing the rotational speed of the rotor assembly; and a screw mechanism for advancing and retreating the valve element with respect to the valve seat via the reduction gear apparatus by means of the rotational movement of the rotor assembly. The rotor assembly and the reduction gear apparatus are arranged in a space defined by the valve body and the can. In this motor-operated valve, the reduction gear apparatus includes a sun gear integral with the rotor assembly; a fixed gear having a ring gear, which is fixed on the valve body side; a planetary gear which is supported on a carrier and meshes with the sun gear and the fixed gear at the same time; and an output gear having a ring gear meshing with the planetary gear, a cylindrical gear case which supports the fixed gear by an upper end portion is fixed to a holder fixedly arranged in a space in the can, and the output gear located in a space in the gear case below the fixed gear is directly or indirectly supported by the holder so as to be rotatable.

By providing the above-described means, a construction can be obtained in which a strong valve operating force is achieved, high resolution is provided, and the gear case for the reduction gear apparatus is fixed rationally in a limited space.

Further, a construction for keeping a uniform pressure in the can at the time of the expansion and contraction of bellows can be secured.

BRIEF DESCRIPTION OF THE DRAWINGS

FIG. 2 is an explanatory view showing the details of a valve body, supporting member, valve rod, and the like.

DETAILED DESCRIPTION OF THE PREFERRED EMBODIMENTS

Figure 1:
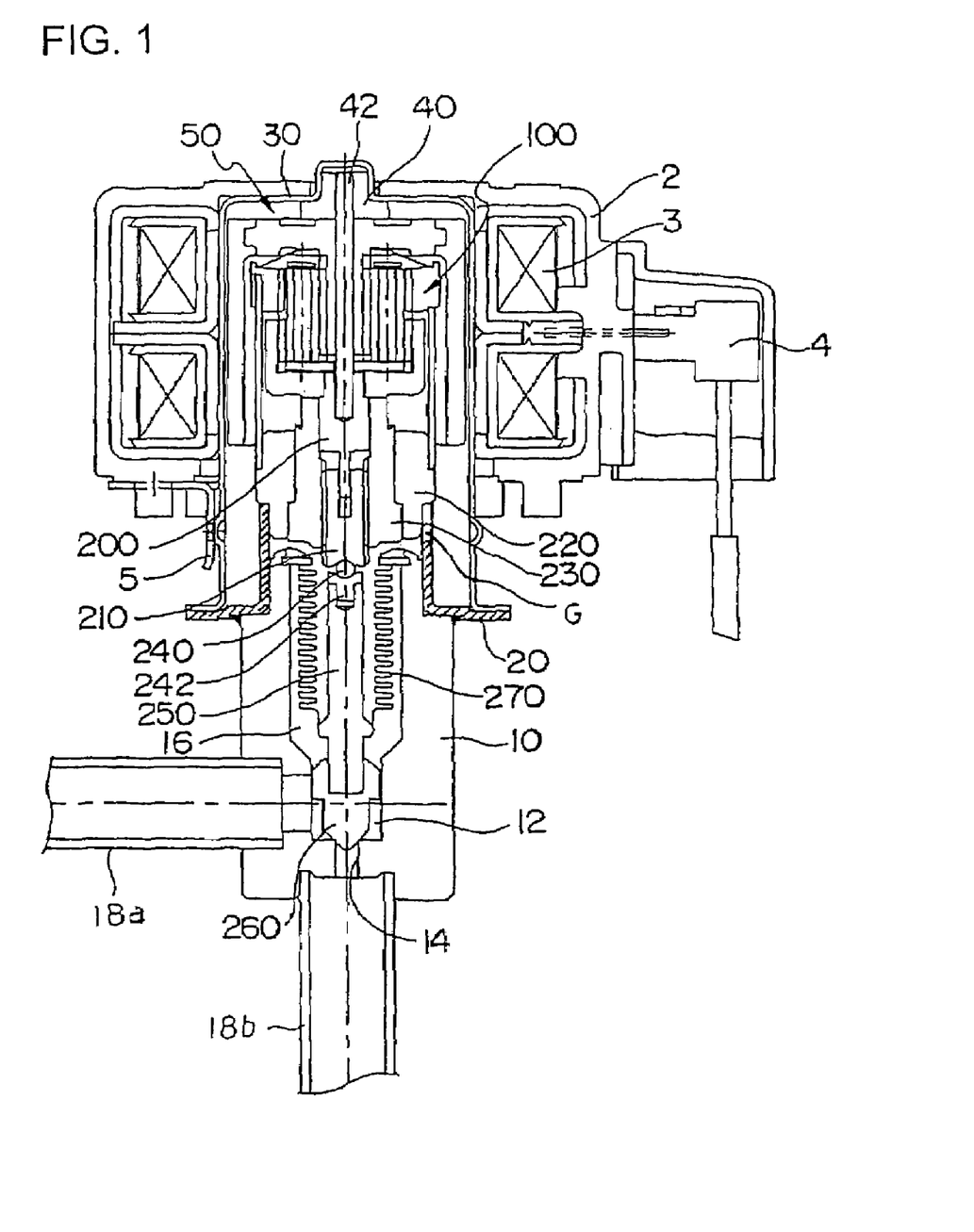
FIG. 1 is a sectional view showing a general construction of a canned gear motor-operated valve in accordance with the present invention.

FIG. 1 is a sectional view showing a general construction of a canned gear motor-operated valve in accordance with the present invention.

A canned gear motor-operated valve the whole of which is denoted by reference numeral 1 has a rotor assembly 50 provided rotatably in a can 30, which is a gastight vessel. On the outside of the can 30, a motor energizing device 2 in which a coil 3 constituting a motor stator is molded integrally with a resin is provided, and is detachably fitted to the can 30 with a installation member 5 formed by a plate spring. The coil 3 is connected to a power source on the outside via an electrical circuit 4.

The can 30 is fixed to a valve body 10 via a supporting member 20. The valve body 10 has a valve chamber 12 and an orifice 14, and refrigerant pipes 18a and 18b are fixed to the valve body 10. A chamber 16 into which a refrigerant is introduced is provided so as to communicate with the valve chamber 12 of the valve body 10.

The rotor assembly 50 mounted in the can 30 is rotated by a drive signal supplied to the coil 3 of the motor energizing device fitted on the outside of the can 30.

The rotation of the rotor assembly 50 is transmitted to an output shaft 200 of an output gear 160 while the rotational speed thereof is reduced by a reduction gear apparatus 100 provided with a planetary gear. The output shaft 200 drives a screw shaft 210. The screw shaft 210 is threadedly engaged with a bearing 230, and the bearing 230 is supported on a holder 220 fixed to the supporting member 20.

The bearing 230 is sometimes formed integrally with the holder 220. At this time, the output gear 160 (output shaft 200) is directly supported on the holder 220.

The travel of the screw shaft 210 is transmitted to a valve rod 250 via a ball 240 and a ball receiving member 242, and a valve element 260 mounted at the tip end of the valve rod 250 is moved up and down. The flow path area between the valve element and the orifice is controlled, so that the flow rate of refrigerant is regulated.

On the outside of the valve rod 250 is installed a bellows 270, so that the refrigerant introduced into the chamber 16 communicating with the valve chamber 12 is prevented from intruding into the can 30.

The details of component members of the canned gear motor-operated valve in accordance with the present invention will be explained with reference to FIGS. 2 to 11.

Figure 2:
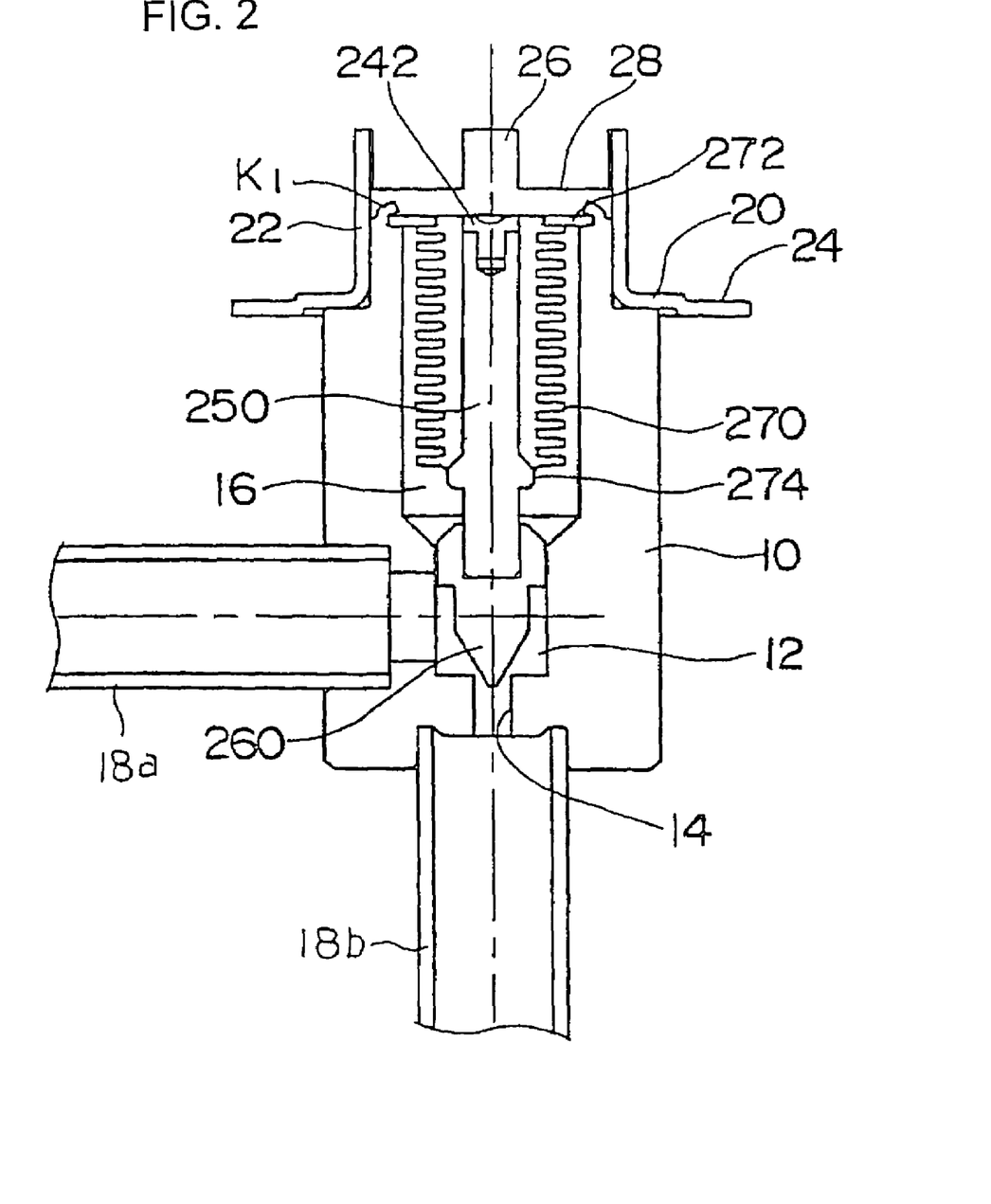

FIG. 2 shows the details of the valve body 10, the supporting member 20, the valve rod 250, and the like.

The valve body 10 has the valve chamber 12 and the orifice 14, and the pipes 18a and 18b are fixed to the valve body 10. The supporting member 20 fixed to the upper part of the valve body 10 has a cylindrical portion 22 and a flange portion 24 expanding horizontally from the cylindrical portion 22. The flange portion 24 receives the opening end portion of the can. The upper end of the cylindrical portion 22 is formed into four concave portions 28 and a convex portion 26, and is engaged with the holder 220.

The convex portion 26 of the supporting member 20 supports the holder 220, and a gap G is provided between the supporting member 20 and the holder 220 so that air is allowed to flow. Therefore, even if the bellows, described later, expands or contracts, the pressure on the inside and outside of the supporting member 20 can be uniformed, so that an influence on operation is not exerted.

The upper end of the bellows 270 installed on the outside of the valve rod 250 supporting the valve element 260 is fixed to the valve body 10 by a staking portion $K_1$ via a ring member 272. A lower end 274 of the bellows 270 is fixed to the valve rod 250. The bellows 270 prevents the refrigerant introduced into the chamber 16 of the valve body 10 from intruding to the can side.

Figure 3:
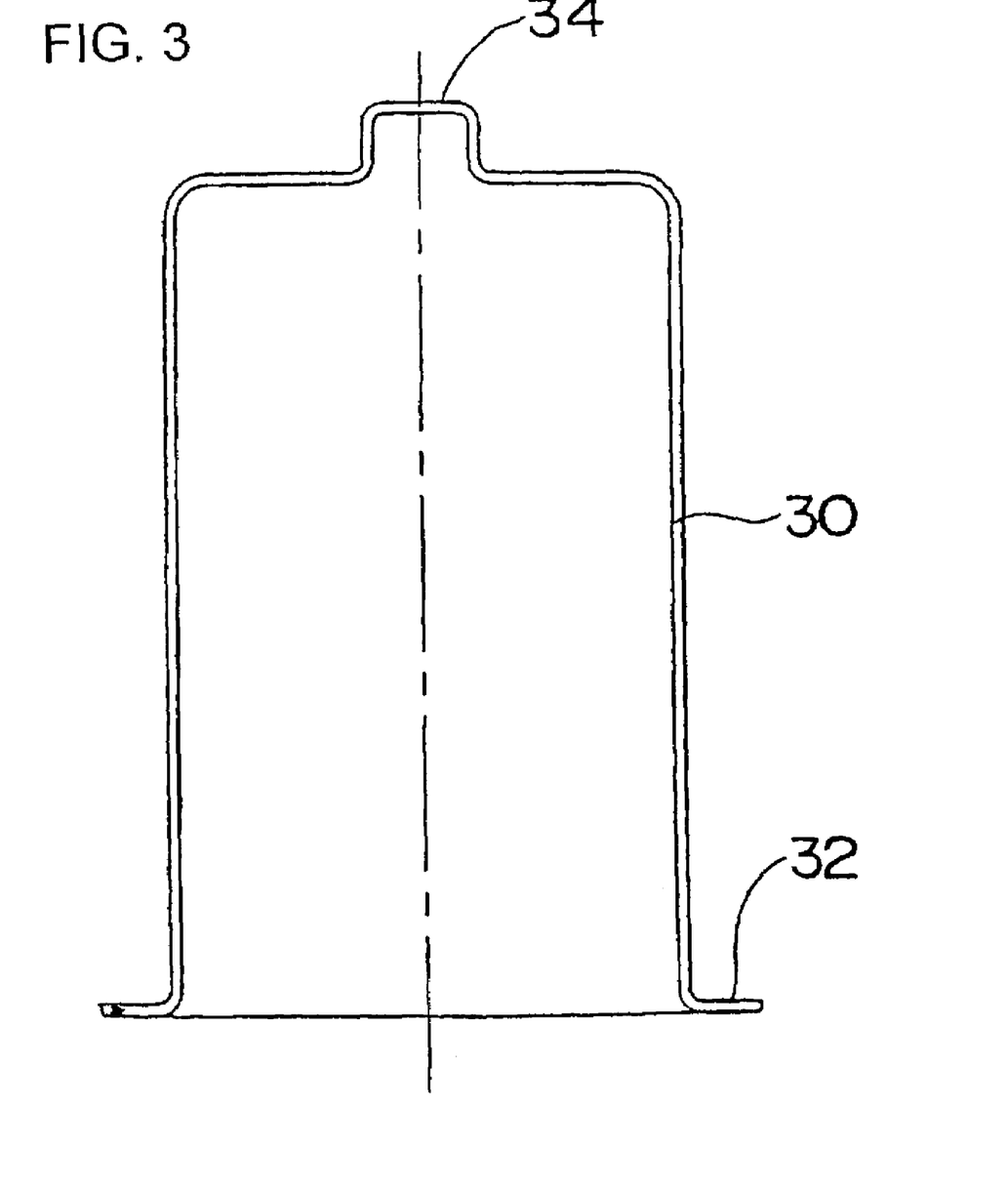
FIG. 3 is a sectional view a can fixed to a supporting member.

FIG. 3 is a sectional view of the can 30 fixed to the supporting member 20.

The can 30, which is a cylindrical pressure vessel, has a flange portion 32 lapped on the flange portion 24 of the supporting member 20, and is formed with a protruding portion 34, which accommodates a bearing, in the top portion thereof.

Figure 4:
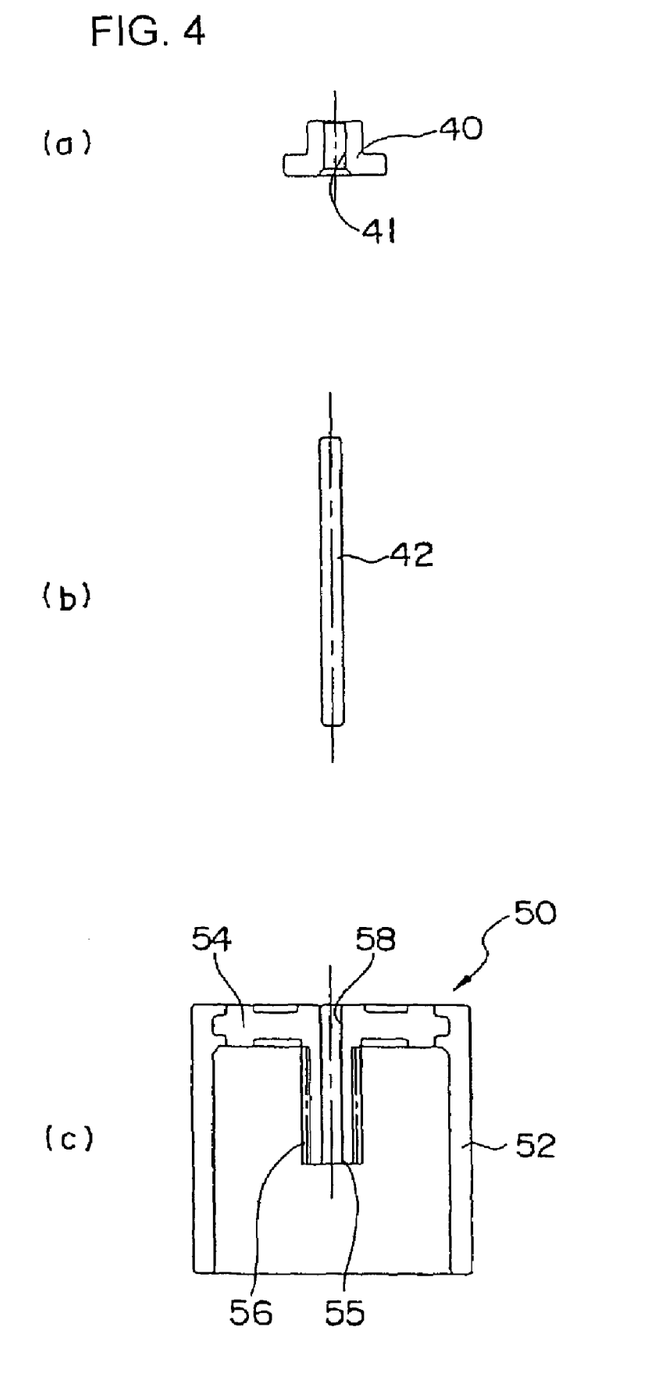
FIG. 4 is an explanatory view showing the details of a bearing, shaft, and rotor assembly.

FIG. 4 shows the details of a bearing 40, a shaft 42, and the rotor assembly 50.

The bearing 40 is pressed into the protruding portion 34 in the top portion of the can 30 under pressure. In a hole 41 in the bearing 40 is inserted the shaft 42.

The rotor assembly 50 is formed of a plastic material containing a magnetic material, and is molded integrally with a sun gear member 54 disposed in the center thereof.

In the center of the sun gear member 54, a boss 55 having a through hole, through which the shaft 42 passes is provided. On the outside of the boss 55, a sun gear 56 constituting a planetary gear speed reduction mechanism is formed.

Figure 5:
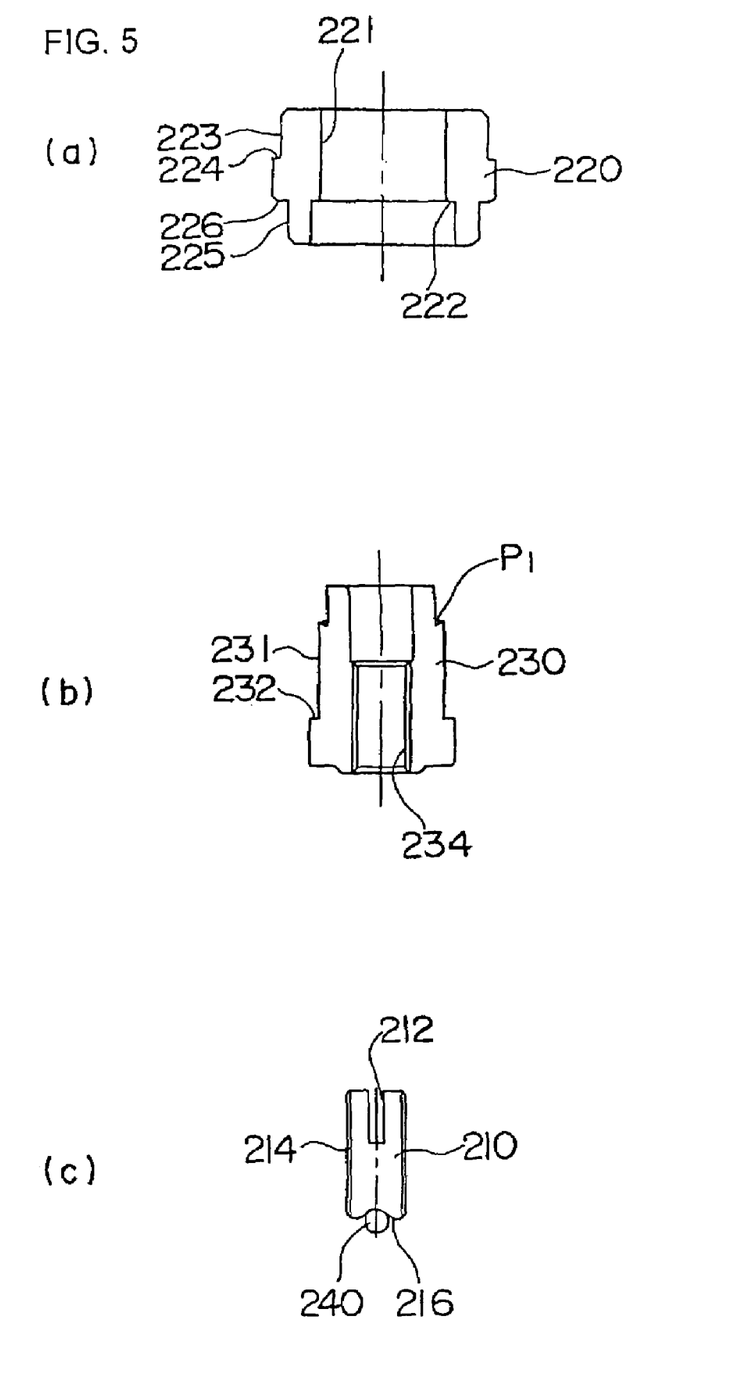
FIG. 5 is an explanatory view showing the details of a holder, screw bearing, screw shaft, and ball.

FIG. 5 shows the details of the holder 220, the bearing 230, the screw shaft 210 and the ball 240.

The holder 220 has an inside diameter portion 221 in which an outside diameter 231 of the bearing 230 is inserted and a step portion 222, and a step portion 232 on the outside diameter of the bearing 230 abuts on the step portion 222. The bearing 230 and the holder 220 are integrated with each other by a pressing portion $P_1$ or the like after the bearing 230 has been fitted in the holder 220.

An outside diameter portion 223 on the upper side of the holder 220 is fitted with a gear case, described later, and the gear case is supported on a step portion 224. An outside diameter portion 225 on the lower side of the holder 220 is inserted in the upper end portion of the supporting member 20 fixed to the valve body 10, and the upper end portion of the supporting member 20 is fixed by a step portion 226. The convex portion 26 of the supporting member 20 holds the holder 220 by welding etc.

The bearing 230 has an internal thread portion 234 so that an external thread portion 214 of the screw shaft 210 is threadedly engaged with the internal thread portion 234. The screw shaft 210 has a slit 212, in which a driver of the output shaft of the reduction gear apparatus 100, described later, is inserted, at an upper part, and the ball 240 is fixed to a lower concave portion 216.

Figure 6:
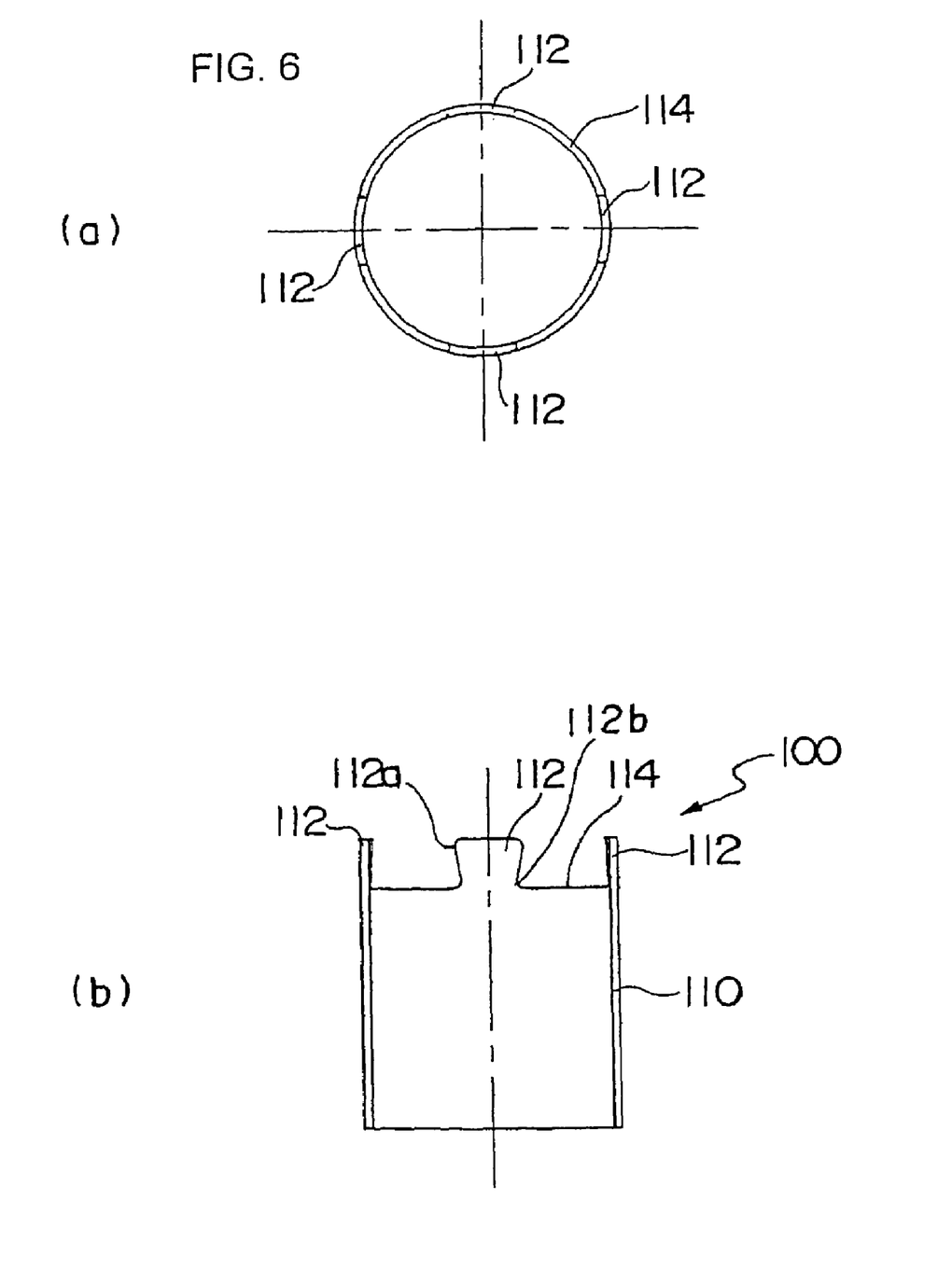
FIG. 6 is an explanatory view showing the details of a gear case constituting a reduction gear apparatus.

FIG. 6 shows the details of the gear case 110 constituting the reduction gear apparatus 100.

The gear case 110 is a cylindrical member, and the lower part thereof is fitted on the upper part of the holder 220. The upper end of the gear case 110 is formed with four extending elements 112. The extending element 112 is formed in an inversely tapered shape such that a tip end 112a thereof has a greater width than a root 112b thereof, and has undercut portions at both-side edges.

The extending elements 112 of the gear case 110 is inserted in concave portions 124 of a fixed gear 120 and is heated, by which plastic of the raw material for the fixed gear 120 is melted, so that the fixed gear 120 is fixed surely to the gear case 110.

Figure 7:
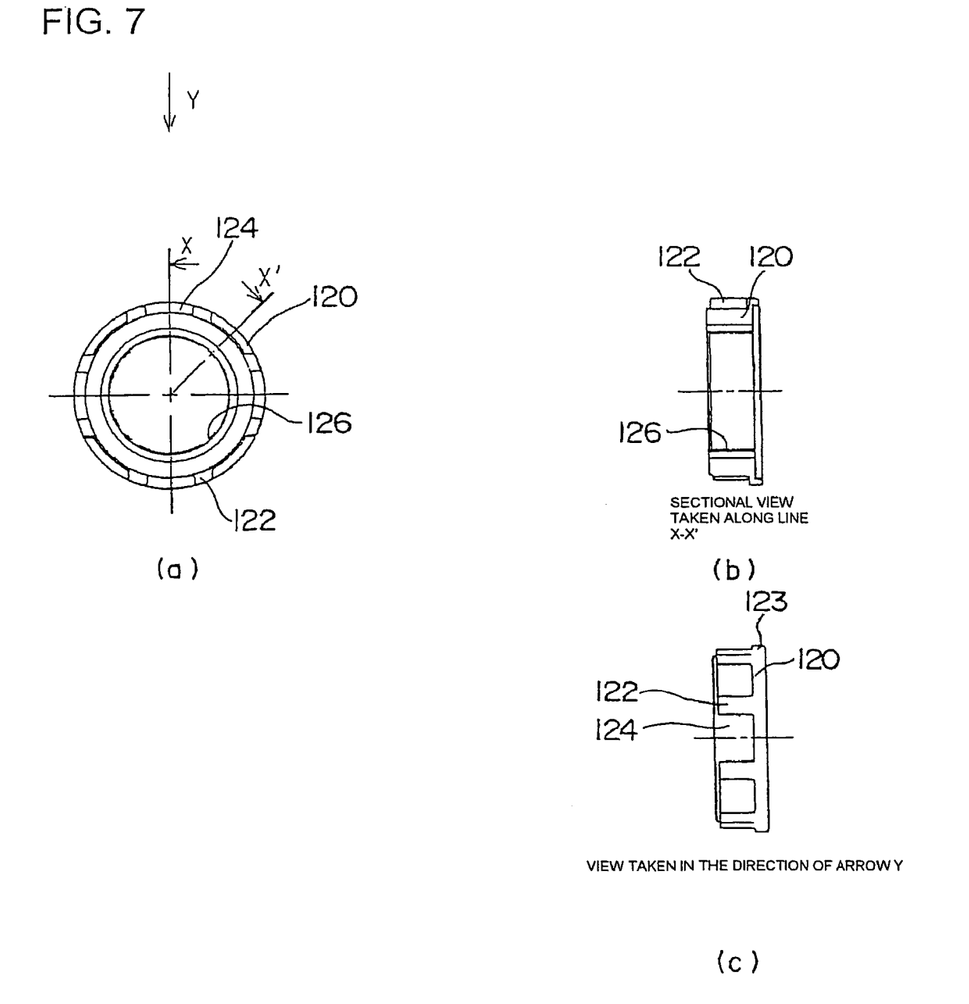
FIG. 7 is an explanatory view showing the details of a fixed gear 120.

FIG. 7 shows the details of the fixed gear 120.

The fixed gear 120 is manufactured by molding, for example, plastic, and is formed with a flange 123 in the outer peripheral portion thereof, concave portions 124 fixed to the upper part of the gear case, and convex portions 122. On the inner periphery side of the fixed gear, a ring gear 126 constituting the planetary gear speed reduction mechanism is formed.

Figure 8:
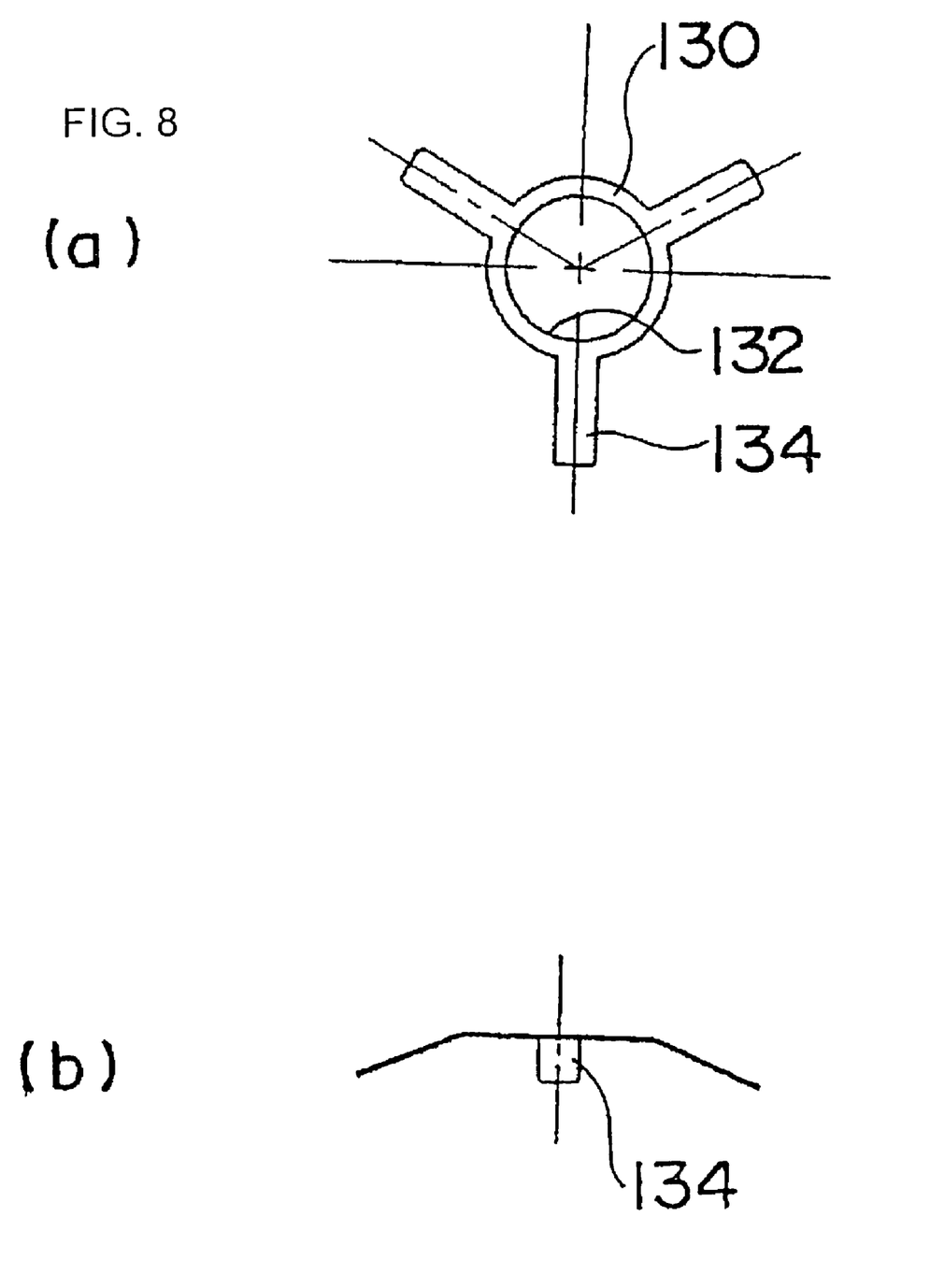
FIG. 8 is an explanatory view showing the details of a belleville spring for preventing the float of a fixed gear.

FIG. 8 shows the details of a belleville spring 130 for restraining the float of the fixed gear and the noise caused by vibrations at the time of the rotor rotation.

As also shown in FIG. 1, the fixed gear 120 fitted in the upper part of the gear case 110 is prevented from floating by the belleville spring 130 disposed between the fixed gear 120 and the rotor assembly 50.

Also, vibrations occurring at the time of rotor rotation are reduced by the spring property of the belleville spring, and noise caused by the vibrations is restrained. The belleville spring 130 has a hole 132 through which the sun gear 56 of the rotor assembly 50 passes and spring portions 134 extending to three directions.

Figure 9:
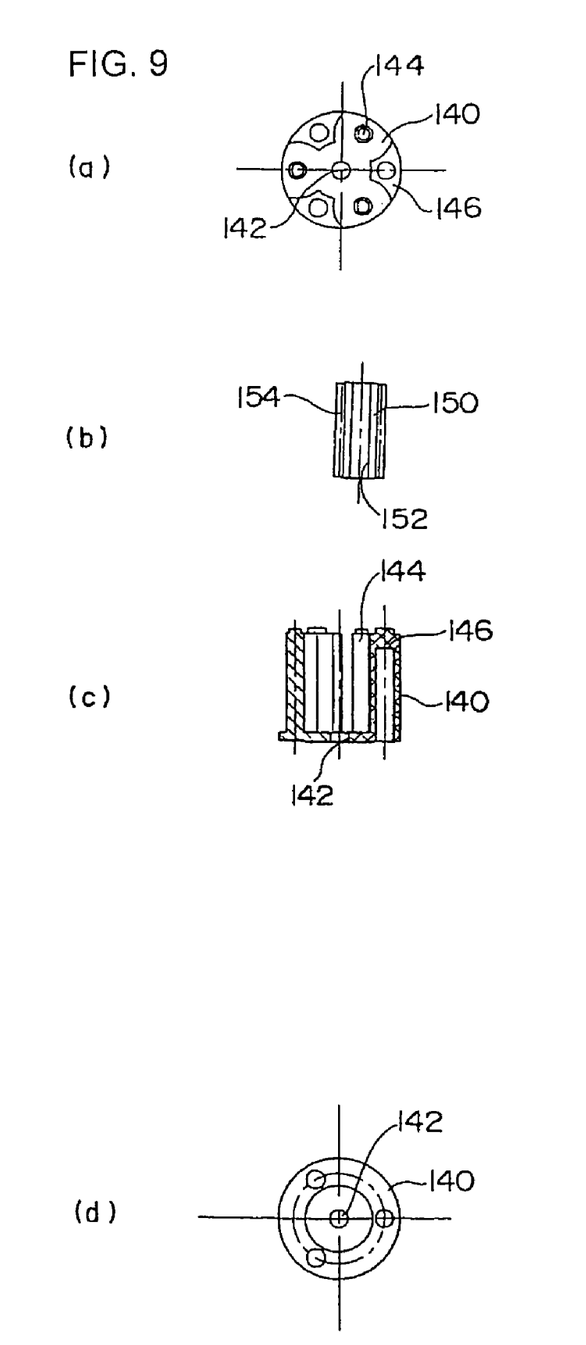
FIG. 9 is an explanatory view showing the details of a carrier and a planetary gear which constitute a reduction gear apparatus.

FIG. 9 shows the details of a carrier 140 and the planetary gear 150, which constitute the reduction gear apparatus having the planetary gear.

The carrier 140 is manufactured by molding, for example, plastic, and has a hole 142, through which the shaft 42 passes, in the center thereof. The carrier 140 has three masts 144 and three partition walls 146. The planetary gear 150 has a hole 152 fitted on the mast 144 and a gear portion 154. On the upper surface of the carrier 140 in which the three planetary gears 150 are fitted on the masts 144, a plate is put, and the masts 144 and convex portions at the tops of the partition walls 146 are pressed into the holes in the plate under pressure, by which the carrier 140 is fixed to the plate.

Figure 10:
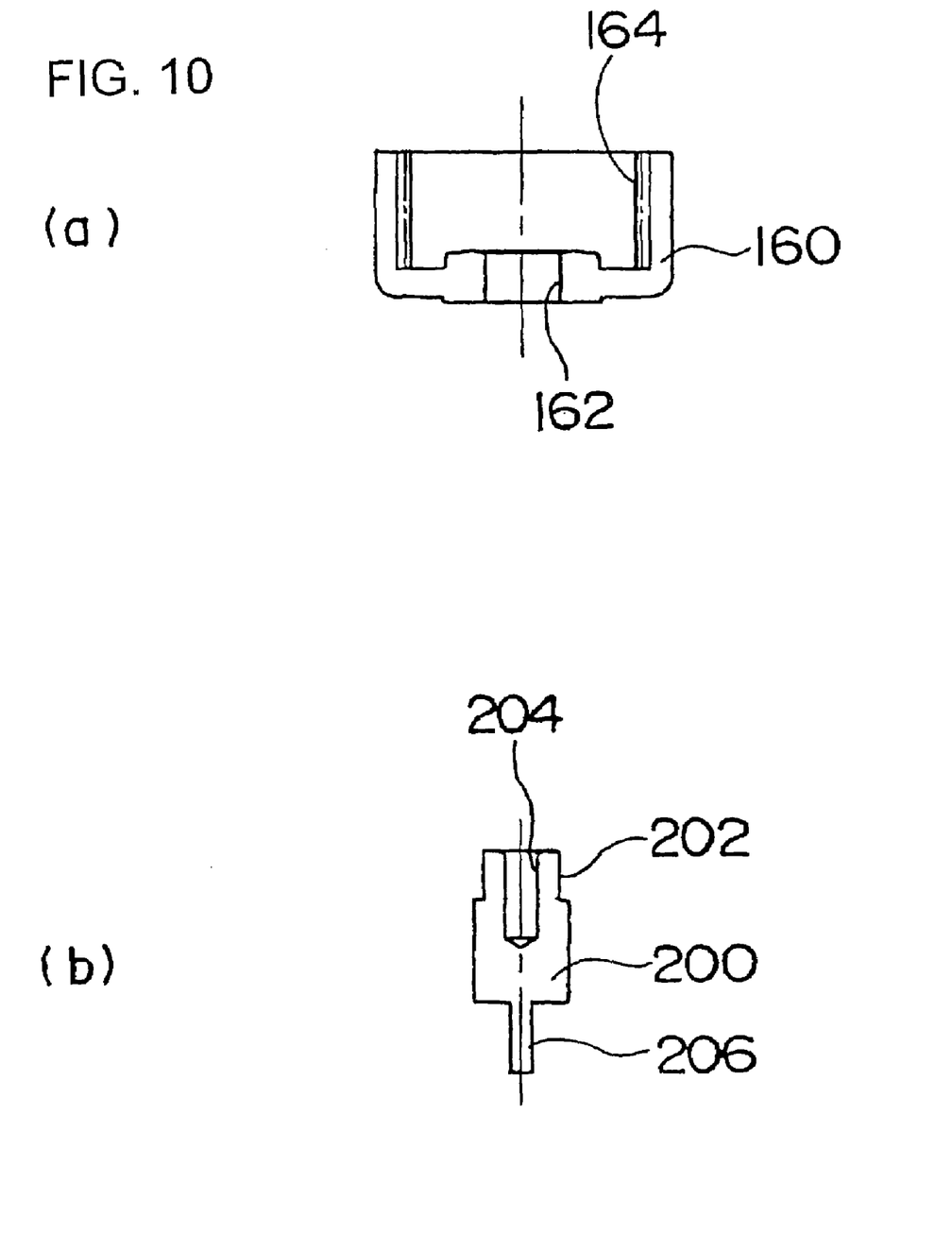
FIG. 10 is an explanatory view showing the details of an output gear and an output shaft which constitute a reduction gear apparatus.

FIG. 10 shows the details of the output gear 160 and the output shaft 200 integral with the output gear 160, which constitute the reduction gear apparatus.

The output gear 160 has a hole 162 into which a columnar portion of the output shaft 200 is pressed under pressure. On the inside of the output gear 160 is formed a ring gear 164.

The output shaft 200 has a bottomed hole 204 for accommodating the shaft 42 and a flat driver portion 206. The flat driver portion 206 is engaged with the slit 212 of the screw shaft 210.

The reduction gear apparatus 100 is configured so that the sun gear 56 of the rotor assembly 50 serves as an input gear, and the planetary gear 150 supported on the carrier 140 meshes with the sun gear 56 and the ring gear 126 of the fixed gear 120 at the same time.

The planetary gear 150 of this carrier also meshes with the ring gear 164 of the output gear 160, so that the input of the sun gear 56 is outputted to the output gear 160 while the speed thereof is reduced.

The reduction gear apparatus 100 has a high speed reducing ratio, and can reduce the speed greatly, for example, at a ratio of about 50 to 1.

Thus, the rotational speed of the rotor assembly 50 is reduced to, for example, one-fiftieth and is transmitted to the screw shaft 210.

The screw shaft 210 can rotate at a low speed, so that valve opening control with high resolution is achieved.

Figure 11:
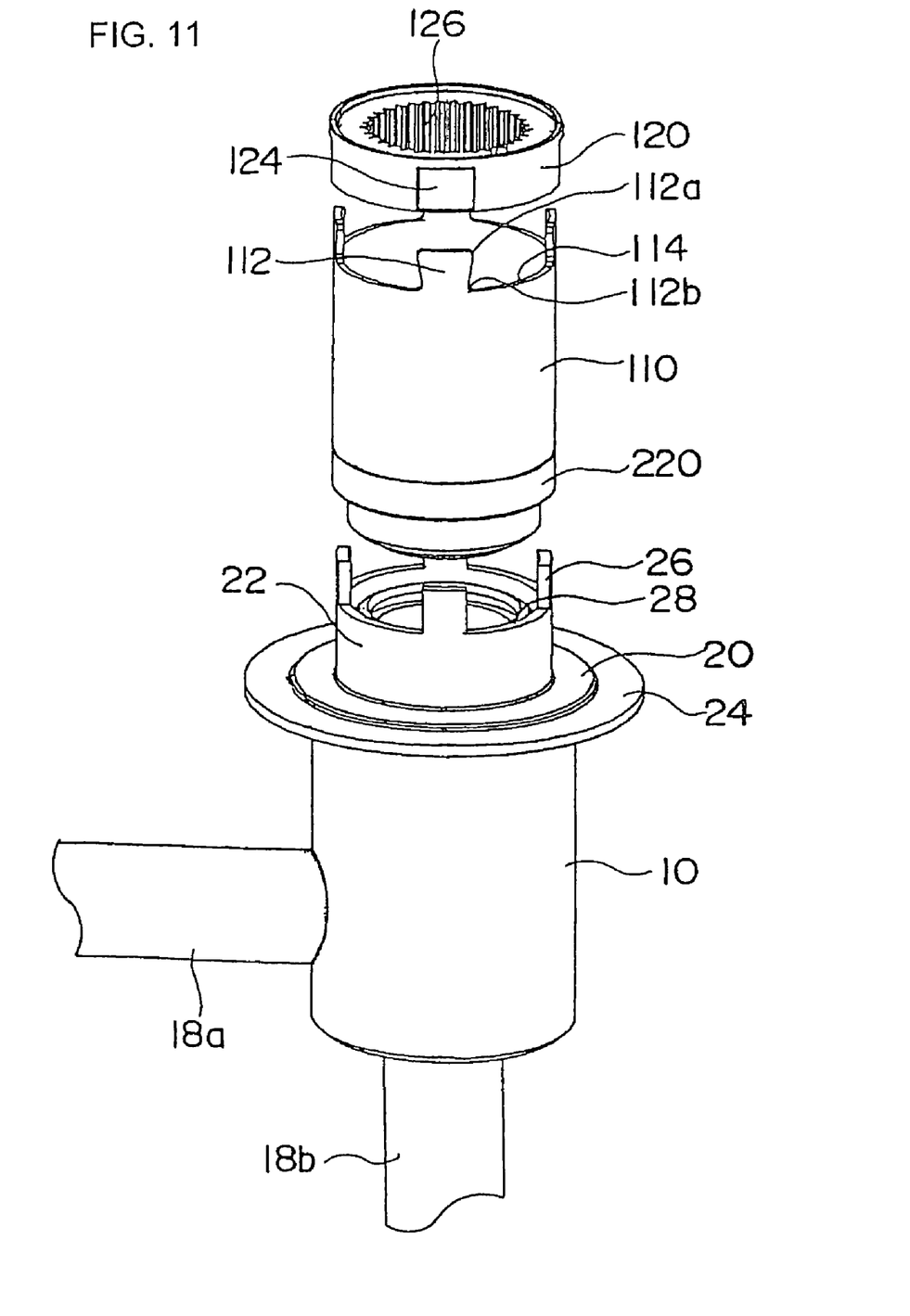
FIG. 11 is a perspective view showing a state in which principal elements are assembled.

FIG. 11 is a perspective view showing a state in which principal elements are assembled.

The two pipes 18a and 18b are fixed to the valve body 10. The supporting member 20 is welded to the upper portion of the valve body 10, and the holder 220 is supported by welding of the four convex portions of the supporting member 20.

The gear case 110 is fitted in the upper part of the holder 220. The four extending elements 112 and concave portions 114 are formed in the upper part of the gear case 110.

The tip end 112a of the extending element 112 is formed so as to have a greater width than the root 112b. The fixed gear 120 made of a resin etc. is formed with the ring gear 126 on the inner peripheral surface thereof, and is formed with four concave portions 124 in the outer peripheral portion thereof.

The fixed gear 120 is fixed firmly by engaging the concave portions 124 with the extending elements 112 of the gear case 110 and by heating this portion to melt the plastic-made fixed gear.

This motor-operated valve has a construction such that the gear case is fixed surely, and the pressure in the can corresponding to the expansion and contraction of bellows is kept uniform.

What is claimed is:

1. A motor-operated valve provided with a reduction gear apparatus, comprising a valve body having a valve chamber and a valve seat; a valve element disposed so as to be capable of opening and closing an opening of the valve seat in the valve chamber; a valve rod for operating the valve element; a cylindrical can fixed to the valve body; a motor energizing device mounted in an outer peripheral portion of the can; a permanent magnet type rotor assembly which is supported rotatably on an inner peripheral portion of the can and is rotationally driven by the motor energizing device; a reduction gear apparatus for reducing the rotational speed of the rotor assembly; and a screw mechanism for advancing and retreating the valve element with respect to the valve seat via the reduction gear apparatus by means of the rotational movement of the rotor assembly, the rotor assembly and the reduction gear apparatus being arranged in a space defined by the valve body and the can, wherein the reduction gear apparatus includes a sun gear integral with the rotor assembly; a fixed gear having a ring gear, which is fixed on the valve body side; a planetary gear which is supported on a carrier and meshes with the sun gear and the fixed gear at the same time; and an output gear having a ring gear meshing with the planetary gear, a cylindrical gear case which supports the fixed gear by an upper end portion is fixed to a holder fixedly arranged in a space in the can, and the output gear located in a space in the gear case below the fixed gear is directly or indirectly supported by the holder so as to be rotatable, wherein the fixed gear is fixed to the gear case in a state in which a plurality of extending elements extending from an upper end of the gear case intrude in concave portions provided concavely in an outer peripheral surface of the fixed gear, and an undercut portion is formed in both-side edges of the extending element, and a part of the fixed gear made of a synthetic resin is caused to intrude into the undercut portion by thermal fusion via an appropriate heating means, by which the fixed gear is fixed to the gear case so as to be unseparable.

2. The motor-operated valve provided with a reduction gear apparatus according to claim 1, wherein the holder is fixedly held by a supporting member fixedly provided on the valve body.

3. A motor-operated valve provided with a reduction gear apparatus, comprising a valve body having a valve chamber and a valve seat; a valve element disposed so as to be capable of opening and closing an opening of the valve seat in the valve chamber; a valve rod for operating the valve element; a cylindrical can fixed to the valve body; a motor energizing device mounted in an outer peripheral portion of the can; a permanent magnet type rotor assembly which is supported rotatably on an inner peripheral portion of the can and is rotationally driven by the motor energizing device; a reduction gear apparatus for reducing the rotational speed of the rotor assembly; and a screw mechanism for advancing and retreating the valve element with respect to the valve seat via the reduction gear apparatus by means of the rotational movement of the rotor assembly, the rotor assembly and the reduction gear apparatus being arranged in a space defined by the valve body and the can, wherein the reduction gear apparatus includes a sun gear integral with the rotor assembly; a fixed gear having a ring gear, which is fixed on the valve body side; a planetary gear which is supported on a carrier and meshes with the sun gear and the fixed gear at the same time; and an output gear having a ring gear meshing with the planetary gear, a cylindrical gear case which supports the fixed gear by an upper end portion is fixed to a holder fixedly arranged in a space in the can, and the output gear located in a space in the gear case below the fixed gear is directly or indirectly supported by the holder so as to be rotatable, wherein the holder is fixedly held by a supporting member fixedly provided on the valve body, and a gap for uniforming the pressure on the inside and outside of the supporting member is provided between the supporting member and the holder.

* * * * *